July 22, 1958                F. D. JONES                2,843,992
            EAR PICK-UP ATTACHMENT FOR A CORN HARVESTER
                         Filed July 29, 1957

INVENTOR.
Frank D. Jones
BY
C. Parker and W. A. Murray
Attorneys

United States Patent Office 2,843,992
Patented July 22, 1958

2,843,992

EAR PICK-UP ATTACHMENT FOR A CORN HARVESTER

Frank D. Jones, Moline, Ill., assignor to Deere & Company, Moline, Ill., a corporation of Illinois Application July 29, 1957, Serial No. 674,824

7 Claims. (Cl. 56—104)

This invention relates to a corn harvester and more particularly to mechanism in the harvester which operates to pick up loose and fallen ears in the field.

The conventional type of corn harvester incorporates the use of a pair of cooperating rotatable rolls which are transversely spaced apart to form a stalk passage through which the stalks of corn may move as the harvester moves over the field. The rolls are rotated so that adjacent sides thereof move downwardly to drive the stalks downwardly to cause the ears to be severed from the stalk upon coming into contact with the rolls. In the normal operation of a harvester over a field, there are a number of ears of corn which have either fallen from the stalks or are on stalks which are bent over so that the ear rests adjacent to the ground. There is therefore the requirement that the harvester provide some means for picking up the loose or fallen ears and to move them into the harvesting mechanism. There have, of course, been several methods tried to improve the pick-up ability of the harvester. However, the more common method presently used is relatively crude in that it comprises simply a housing structure on opposite sides of the stalk passage which diverges forwardly from the mouth of the passage and is in a ground approximate position so that ears will be fed rearwardly into the harvesting mechanism. As far as fallen ears are concerned the pick-up characteristics of the harvester are generally dependent upon the aggressive characteristics of the forward ends of the snapping rolls in cooperation with the conventional gathering chains on the harvester. It is felt that a more positive aggressive means would be of considerable advantage in picking up fallen or loose ears on the ground.

It is therefore the primary object of this invention to provide an ear pick-up mechanism of a new and novel nature which may be an integral part of the harvester or may be incorporated into the harvester as an attachment.

It is a further object of the invention to incorporate a pick-up mechanism which features a pair of rotatable elements mounted on transverse horizontal shafts which have aggressive means on the elements for picking up the ears on the ground and dispatching them rearwardly into the harvester mechanism.

It is a further object of the invention to incorporate in the pick-up mechanism drive means comprising a pair of ground wheels which rotate upon the harvester being moved over the ground and through suitable transmission means causes the rotatable elements to rotate.

Other objects and advantages of the invention will become apparent to those skilled in the art as the nature of the invention is better understood from the following description as shown in the accompanying drawings.

Figure 1:
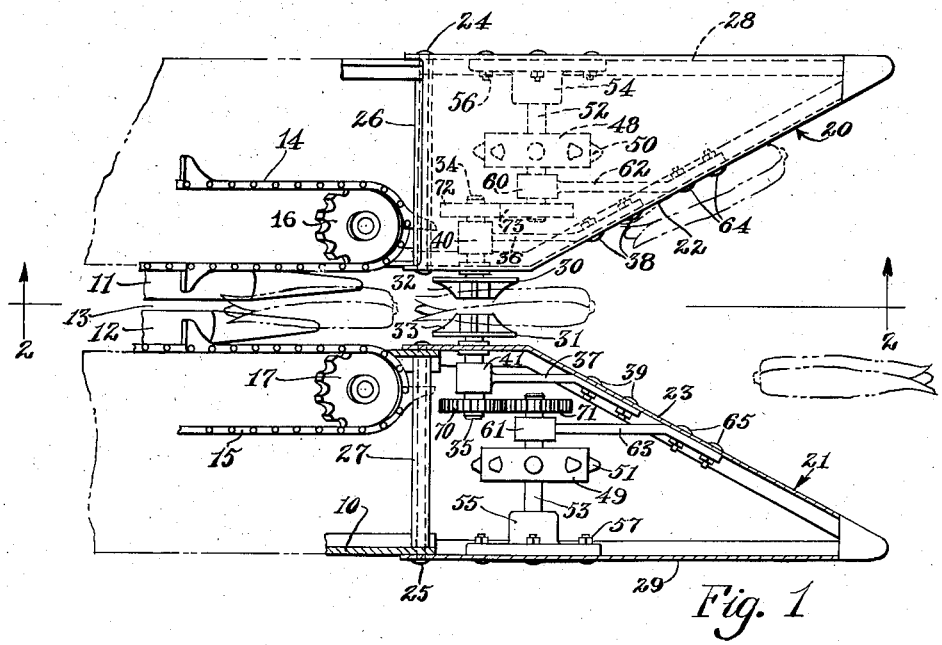
Fig. 1 is a plan view of the forward end of the harvester, with portions of the harvester housing having been removed for purposes of fully viewing the invention.

The harvesting mechanism is shown in more or less representative form and generally for purposes of orientation and includes a harvester main frame 10, a pair of cooperating rotatable rolls 11, 12 transversely spaced apart to form a stalk passage 13. Featured also are a pair of gathering chains 14, 15 positioned on opposite sides of the stalk passage 13 and mounted over a pair of front sprockets 16, 17. The harvester and harvesting mechanism may be treated as conventional and similar to that shown in U. S. Patent 2,622,382 issued to W. E. Slavens, which may be referred to if further detail of the harvester or its harvesting mechanism is desired.

In the present form of the invention, such will be shown as an attachment to the conventional type harvester and as such will be shown to replace the gathering housing structure of the conventional type picker such as that shown in the aforesaid Slavens patent. However, it should be understood that the pick-up mechanism here to be described could be either an integral part of the original harvester or could, as in the present instance, replace the existing gathering structure of the more conventional corn harvesters.

Styling structure forming fore-and-aft extending rigid auxiliary frames 20, 21 is in the form of the conventional gathering points on the harvester with each styling structure 20, 21 being mounted on opposite sides of the stalk passage 13. Each structure 20, 21 has vertical portions 22, 23 diverging outwardly from the forward end of the stalk passage with their lower edges adjacent to the ground whereby ears of corn lying on the ground will normally be fed inwardly to the passage. Also, outer vertical portions 28, 29 extend fore-and-aft from the points of the styling 20, 21.

The auxiliary frames or styling structures 20, 21 are pivotally mounted at their rear to the harvester main frame 10 by elongated transverse rivets or pins 24, 25. Spacer members 26, 27 fit about the pins 24, 25 and serve as transverse structural support for the forward housing or styling structures 20, 21. Since this is the only direct connection to the harvester frame, the forward structures 20, 21 are permitted vertical movement about their rear transverse pivotal connections or pivot pins 24, 25. A pair of vertically disposed rotatable pick-up elements or wheels 30, 31 are provided adjacent to the stalk passage and forwardly of the harvesting mechanism. The pick-up wheels are positioned at the rear of the diverging portions 22, 23 of the forwardly projecting styling structures 20, 21. Consequently, the ears of corn, as shown in Fig. 1, will be fed rearwardly to converge on the pick-up elements 30, 31. The pick-up elements 30, 31 are characterized by having axially extending flights or fingers 32, 33 respectively which operate as aggressive means for picking up the ears of corn. The rotating elements 30, 31 are mounted on transverse drive shafts 34, 35. The drive shafts 34, 35 are supported on the respective styling structures 20, 21 by means of brackets 36, 37 which are bolted, as at 38, 39, to the vertical diverging portions 22, 23. Integral with the brackets 36, 37 are journal boxes 40, 41 which carry the shafts 34, 35.

A pair of ground engaging wheels 48, 49 are positioned on opposite sides of the stalk passage 13. The wheels 48, 49 are provided with lugs 50, 51. Transverse wheel supporting shafts 52, 53 are supported on the styling structures 20, 21 forwardly of the rear pivotal pins 24, 25 by means of journal blocks 54, 55 which are bolted, as at 56, 57, to the outside styling portions 28, 29. Also supporting the transverse shafts 52, 53 are a pair of journal supports 60, 61 disposed inwardly of the respective ground engaging wheels 50, 51. The journal supports 60, 61 are mounted on the forward diverging styling members 22, 23 by means of rearwardly extending brackets 62, 63 bolted as at 64, 65 to the styling portions 22, 23.

Transmission means extend between the pick-up element drive shafts 34, 35 and the wheel supporting shaft 52, 53 and comprise on the right side of the stalk passage 13 a pair of meshing spur gears 70, 71 mounted on the respective shafts 35, 53, and on the left side of the stalk passage 13 by means of meshing spur gears 72, 73 mounted on the respective shafts 34, 52.

Figure 2:
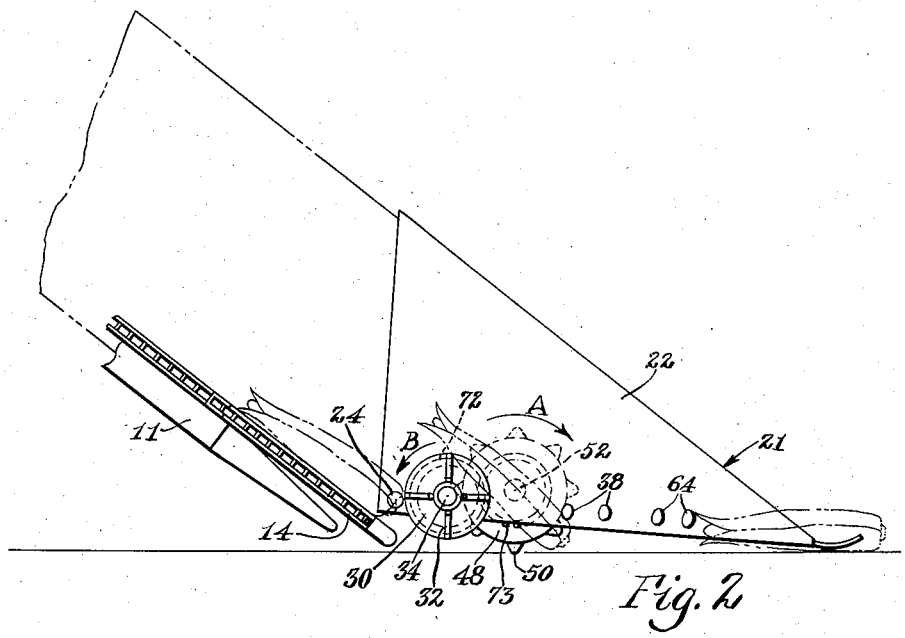
Fig. 2 is a sectional view taken along the lines 2—2 of Fig. 1.

In operation the ear pick-up mechanism operates in the following manner. As shown in Fig. 2, the entire structures 20, 21 are supported at their rear by means of the pivotal connection between the structures and the main frame 10 of the harvester and at a position forwardly of the pivotal connection by means of the ground engaging wheels 48, 49. Consequently, should the forwardly extending structures pass over uneven ground, the wheels 48, 49 will automatically adjust the forwardly extending structures 20, 21 to accommodate the unevenness. As the harvester moves over the ground, the wheels 48, 49 will be driven in a clockwise direction as indicated by the arrow A and since the wheels are fixed to the shafts 52, 53, the shafts will also rotate in clockwise directions. The gear transmissions 70, 71 and 72, 73 will reverse the direction of rotation so that the pick-up element drive shafts 34, 35 will rotate in a counter-clockwise direction as indicated by the arrow B or in a direction so that the forward portions of the pick-up elements will be moving upwardly. The rotatable pick-up elements 30, 31 are spaced sufficiently apart to permit stalks of corn to pass, but will prevent ears of corn to pass between them. Again, as the harvester moves forwardly over the field, the fallen ears, as indicated in representative form in Figs. 1 and 2 will be guided into the rotatable ear pick-up elements 30, 31 where the flight portions of the elements will engage the ears and drive them over the elements (Fig. 2). The pick-up elements 30, 31 will dispatch the ears both upwardly and rearwardly to engage the forward points of the harvester rolls 11, 12. At the time the ears leave the engagement of the pick-up elements 30, 31 the ears will pass to a position where the lugs on the gathering chains 14, 15 will engage them and move them rearwardly to be husked or otherwise treated.

Other forms and variations of the invention will occur to those skilled in the art. However, it should be understood that the present form was described with the purpose of fully and completely illustrating the principles of the invention and in no manner to limit or narrow the invention beyond the broad general principles herein claimed.

What is claimed is:

1. On a corn harvester movable forwardly over a field of row planted corn and having harvesting mechanism forming a stalk passage for successively receiving the stalks of corn as the harvester moves over a row of corn the improvement residing in ear pick-up means comprising: a pair of cooperating rotatable ear pick-up elements on opposite sides of the passage and forwardly of and adjacent to the harvesting mechanism, each of said elements having means thereon for aggressively picking up ears of corn proximate to the ground and dispatching them rearwardly to the harvesting mechanism, and each of the elements being mounted on a respective transverse shaft extending outwardly relative to the passage; a pair of ground engaging wheels on opposite sides of the passage operative to rotate in response to forward movement of the harvester; wheel supporting shafts mounted on the harvester and fixed to the wheels to rotate in unison with the wheels; and transmission means between the wheel-supporting shafts and the transverse shafts for rotating the rotatable elements.

2. On a corn harvester movable forwardly over a field of row planted corn and having harvesting mechanism forming a stalk passage for successively receiving the stalks of corn as the harvester moves over a row of corn the improvement residing in ear pick-up means comprising: a pair of vertically disposed cooperating rotatable ear pick-up elements transversely alined and on opposite sides of the passage and forwardly of and adjacent to the harvesting mechanism, each of said elements having means thereon for aggressively picking up ears of corn proximate to the ground and dispatching them rearwardly to the harvesting mechanism, and each of the elements being mounted on a respective transverse shaft extending outwardly relative to the passage; a pair of ground engaging wheels on opposite sides of the passage operative to rotate in response to forward movement of the harvester; wheel supporting shafts mounted on the harvester and fixed to the wheels to rotate in unison with the wheels; and transmission means between the wheel-supporting shafts and the transverse shafts for rotating the rotatable elements.

3. On a corn harvester having a mobile main frame and movable forwardly over a field of row planted corn and having harvesting mechanism forming a stalk passage for successively receiving the stalks of corn as the harvester moves over a row of corn, the improvement residing in ear pick-up means comprising: a pair of fore-and-aft rigid attachment frames on opposite sides of the passage forwardly of and adjacent to the harvesting mechanism and pivotally mounted at their rear to the main frame for vertical movement; a pair of transversely alined transverse shafts mounted on the respective pair of frames; a pair of vertically disposed rotatable elements, each element having means thereon for aggressively picking up ears of corn proximate to the ground and dispatching them rearwardly to the harvesting mechanism, and each element being mounted on a respective transverse shaft adjacent to the passage; a pair of ground engaging wheels on opposite sides of the passage forwardly of the pivotal connection between the main frame and auxiliary frames operative to rotate in response to forward movement of the harvester; wheel supporting shafts mounted on the auxiliary frames and fixed to the wheels to rotate in unison with the wheels; and transmission means between the wheel-supporting shafts and the transverse shafts for rotating the rotatable elements.

4. On a corn harvester having a mobile main frame and movable forwardly over a field of row planted corn and having harvesting mechanism forming a stalk passage for successively receiving the stalks of corn as the harvester moves over a row of corn, the improvement residing in ear pick-up means comprising: a pair of fore-and-aft rigid attachment frames on opposite sides of the passage forwardly of and adjacent to the harvesting mechanism and pivotally mounted at their rear to the main frame for vertical movement; a pair of transversely alined transverse shafts mounted on the respective pair of frames; a pair of vertically disposed rotatable elements, each element having means thereon for aggressively picking up ears of corn proximate to the ground and dispatching them rearwardly to the harvesting mechanism, and each element being mounted on a respective transverse shaft adjacent to the passage; a pair of ground engaging wheels on opposite sides of the passage forwardly of the pivotal connection between the main frame and auxiliary frames operative to rotate in response to forward movement of the harvester; and drive means between the wheels and the transverse shafts for rotating the rotatable elements.

5. An attachment for a corn harvester having a main moblie frame and having harvesting mechanism forming a stalk passage for successively receiving the stalks of corn as the harvester moves forwardly over a field of corn comprising: a pair of fore-and-aft rigid attachment frames forward of the harvesting mehanism and on opposite sides respectively of the stalk passage; means for mounting the attachment frames to the main frame for relative vertical movement; a pair of cooperating rotatable ear pick-up elements on opposite sides of the passage and forwardly of and adjacent to the harvesting mechanism, each of said elements having means thereon for aggressively picking up ears of corn proximate to the ground and dispatching them rearwardly to the harvesting mechanism; shaft means mounting each of the elements on a respective attachment frame; ground engaging wheel means mounted on the respective attachment frames on opposite sides of the passage and operative to rotate in response to forward movement of the harvester; and drive means between the shaft means and the wheel means for rotating the rotatable elements.

6. An attachment for a corn harvester having a main mobile frame and having harvesting mechanism forming a stalk passage for successively receiving the stalks of corn as the harvester moves forwardly over a field of corn comprising: a pair of fore-and-aft rigid attachment frames forward of the harvesting mechanism and on opposite sides respectively of the stalk passage; means for mounting the attachment frames to the main frame for relative vertical movement; a pair of cooperating rotatable ear pick-up elements mounted on the attachment frames on opposite sides of the passage and forwardly of and adjacent to the harvesting mechanism, each of said elements having means thereon for aggressively picking up ears of corn proximate to the ground and dispatching them rearwardly to the harvesting mechanism; ground engaging wheel means mounted on the respective attachment frames on opposite sides of the passage and operative to rotate in response to forward movement of the harvester; and drive means between the wheel means and the rotatable elements for rotating the latter.

7. An attachment for a corn harvester having a main mobile frame and having harvesting mechanism receiving the stalks of corn as the harvester moves forwardly over a field of corn comprising: a fore-and-aft rigid attachment frame forward of the harvesting mechanism; means for mounting the attachment frame to the main frame for relative vertical movement; a rotatable ear pick-up element forwardly of and adjacent to the harvesting mechanism having means thereon for aggressively picking up ears of corn proximate to the ground and dispatching them rearwardly to the harvesting mechanism; ground engaging wheel means mounted on the attachment frame operative to rotate in response to forward movement of the harvester; and drive means between the wheel means and the rotatable element for rotating the latter.

References Cited in the file of this patent
UNITED STATES PATENTS

| | | |
|---|---|---|
| 2,134,867 | Fergason | Nov. 1, 1938 |
| 2,663,983 | Fergason | Dec. 29, 1953 |